(12) United States Patent
Wang et al.

(10) Patent No.: US 12,190,610 B2
(45) Date of Patent: Jan. 7, 2025

(54) APPLICATION FOR THE IDENTIFICATION OF VEHICLE FEATURES

(71) Applicant: TOYOTA MOTOR ENGINEERING & MANUFACTURING NORTH AMERICA, INC., Plano, TX (US)

(72) Inventors: Timothy Wang, Ann Arbor, MI (US); Roger Akira Kyle, Aubrey, TX (US); Bryan Else Yamasaki, Frisco, TX (US); Justin K Shen, Canton, MI (US); Prince R Remegio, McKinney, TX (US); Jackson Zhu, Belleville, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 17/903,362

(22) Filed: Sep. 6, 2022

(65) Prior Publication Data

US 2024/0078818 A1   Mar. 7, 2024

(51) Int. Cl.
*G06V 20/59* (2022.01)
*G06Q 10/20* (2023.01)
*G06V 10/70* (2022.01)
*G07C 5/08* (2006.01)
*H04N 5/272* (2006.01)

(52) U.S. Cl.
CPC ............ *G06V 20/59* (2022.01); *G06Q 10/20* (2013.01); *G06V 10/70* (2022.01); *G07C 5/0825* (2013.01); *H04N 5/272* (2013.01)

(58) Field of Classification Search
CPC ...................................................... G06V 20/59
See application file for complete search history.

(56) References Cited

U.S. PATENT DOCUMENTS

| | | | |
|---|---|---|---|
| 7,418,408 B1 | 8/2008 | Heppe | |
| 7,672,666 B2 | 3/2010 | Hasan | |
| 10,629,012 B1 | 4/2020 | Gattu | |
| 10,962,378 B2 | 3/2021 | Cronin | |
| 2006/0229777 A1* | 10/2006 | Hudson | G05B 23/021 |
| | | | 701/31.4 |
| 2009/0018859 A1* | 1/2009 | Purifoy | G06Q 10/10 |
| | | | 705/305 |
| 2018/0211122 A1* | 7/2018 | Amico | G06F 18/24 |

FOREIGN PATENT DOCUMENTS

| | | |
|---|---|---|
| CN | 109658520 A | 4/2019 |
| CN | 111179268 A | 5/2020 |
| CN | 114070836 A | 2/2022 |

\* cited by examiner

*Primary Examiner* — Shivang I Patel
(74) *Attorney, Agent, or Firm* — SHEPPARD, MULLIN, RICHTER & HAMPTON LLP; Daniel N. Yannuzzi

(57) ABSTRACT

Systems and methods are provided for determining features in a vehicle. The interior of the vehicle can be scanned with a camera of a mobile device to locate one or more symbols or shapes within the interior. The one or more symbols or shapes can be processed using one or more machine learning models to obtain data associated with the one or more symbols or shapes. The data associated with the one or more symbols or shapes can be displayed to a driver of the vehicle.

20 Claims, 9 Drawing Sheets

400

SCANNING AN INTERIOR OF THE VEHICLE 402

LOCATING ONE OR MORE SYMBOLS OR SHAPES WITHIN THE INTERIOR 404

PROCESSING THE ONE OR MORE SYMBOLS USING ONE OR MORE MACHINE LEARNING MODELS 406

OBTAINING DATA ASSOCIATED WITH THE ONE OR MORE SYMBOLS OR SHAPES 408

DISPLAYING THE DATA ASSOCIATED WITH THE ONE OR MORE SYMBOLS OR SHAPES 410

```
SCANNING AN INTERIOR OF THE VEHICLE 502
```

```
LOCATING ONE OR MORE SYMBOLS OR
SHAPES WITHIN THE INTERIOR 504
```

```
PROCESSING THE ONE OR MORE SYMBOLS
USING ONE OR MORE MACHINE LEARNING
MODELS 506
```

```
OBTAINING DATA ASSOCIATED WITH THE ONE
OR MORE SYMBOLS OR SHAPES 508
```

```
DETERMINING THAT THE ONE OR MORE
SYMBOLS OR SHAPES SYMBOLIZE ONE OR
MORE ERRORS 510
```

```
DISPLAYING THE DATA ASSOCIATED WITH THE
ONE OR MORE SYMBOLS OR SHAPES 512
```

```
RECEIVING A PROMPT FROM THE DRIVER TO
MAKE AN APPOINTMENT 514
```

```
SCHEDULING AN APPOINTMENT FOR VEHICLE
MAINTENANCE 516
```

FIG. 5

APPLICATION FOR THE IDENTIFICATION OF VEHICLE FEATURES

TECHNICAL FIELD

The present disclosure relates generally to applications on mobile devices, and in particular, applications that can scan areas with the mobile device's camera. The present disclosure also relates to image recognition, in particular, a camera's ability to recognize symbols or shapes to make a determination associated with the symbols or shapes.

DESCRIPTION OF RELATED ART

Cameras on mobile devices can be used to scan areas using a live camera field of view. Image recognition techniques can allow a mobile device to identify objects, places, people, writing, and actions in the camera's field of view. In combination with one or more machine learning models, mobile devices can perform various functions with the resulting identification data, such as display the identification data, or manipulate the camera field of view based on the identified objects.

BRIEF SUMMARY OF THE DISCLOSURE

According to various embodiments of the disclosed technology, a method for determining features in a vehicle, comprises scanning an interior of the vehicle with a camera of a mobile device; locating one or more symbols or shapes within the interior; processing the one or more symbols or shapes using one or more machine learning models; obtaining data associated with the one or more symbols or shapes; and displaying the data associated with the one or more symbols or shapes to a driver of the vehicle.

In some embodiments, processing the one or more symbols or shapes comprises determining a meaning of a symbol of the one or more symbols or shapes.

In some embodiments, displaying the data associated with the one or more symbols or shapes comprises displaying the data on a live camera view of the interior of the vehicle.

In some embodiments, displaying the data associated with the one or more symbols or shapes comprises displaying the data on a photograph of the interior of the vehicle.

In some embodiments, processing the one or more symbols or shapes comprises determining that at least one of the one or more symbols or shapes represents an error associated with the vehicle.

In some embodiments, determining that at least one of the one or more symbols or shapes represents an error comprises determining that a symbol or shape of the one or more symbols or shapes is located on a dashboard of the vehicle.

In some embodiments, processing the one or more symbols or shapes comprises determining a function of an actuation mechanism based on a shape of the actuation mechanism.

In some embodiments, locating one or more symbols or shapes within the interior comprises determining what area of the interior is being scanned.

According to various embodiments of the disclosed technology, a mobile device comprises: a processor and a memory coupled to the processor to store instructions, which when executed by the processor, cause the processor to perform operations, the operations comprising: scanning a dashboard of a vehicle with a camera of a mobile device; locating one or more symbols or shapes displayed on the dashboard; processing the one or more symbols or shapes using one or more machine learning models; obtaining data associated with the one or more symbols or shapes; determining that the one or more symbols or shapes symbolize one or more errors associated with the vehicle; displaying the data associated with the one or more symbols or shapes to a driver of the vehicle; receiving a prompt from the driver to make an appointment for vehicle maintenance; and scheduling an appointment for vehicle maintenance based on the one or more errors.

In some embodiments of the mobile device, displaying the data associated with the one or more symbols or shapes comprises displaying the data on a live camera view of the dashboard.

In some embodiments of the mobile device, displaying the data associated with the one or more symbols or shapes comprises displaying the data on a photograph of the dashboard.

In some embodiments of the mobile device, determining that the one or more symbols or shapes symbolize one or more errors comprises determining that the one or more symbols or shapes are located on a dashboard of the vehicle.

In some embodiments of the mobile device, scheduling an appointment for vehicle maintenance comprises transmitting data associated with the one or more errors to a dealership.

In some embodiments of the mobile device, the data associated with the one or more errors comprises a vehicle identification number (VIN), the one or more errors, and vehicle maintenance to resolve the one or more errors.

According to various embodiments of the disclosed technology, a non-transitory machine-readable medium having instructions stored therein, which when executed by a processor, cause the processor to perform operations, the operations comprising: scanning an interior of a vehicle with a camera of a mobile device; determining what area of the interior is being scanned; locating one or more symbols or shapes within the interior; determining a meaning of the one or more symbols or shapes. obtaining data associated with the one or more symbols or shapes; and displaying the data associated with the one or more symbols or shapes to a driver of the vehicle.

In some embodiments of the non-transitory machine-readable medium, displaying the data associated with the one or more symbols or shapes comprises displaying the data on a live camera view of the interior of the vehicle.

In some embodiments of the non-transitory machine-readable medium, displaying the data associated with the one or more symbols or shapes comprises displaying the data on a photograph of the interior of the vehicle.

In some embodiments of the non-transitory machine-readable medium, processing the one or more symbols or shapes comprises determining that at least one of the one or more symbols or shapes represents an error associated with the vehicle.

In some embodiments of the non-transitory machine-readable medium, determining that at least one of the one or more symbols or shapes represents an error comprises determining that a symbol or shape is located on a dashboard of the vehicle.

In some embodiments of the non-transitory machine-readable medium, processing the one or more symbols or shapes comprises determining a function of an actuation mechanism based on a shape of the actuation mechanism.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 illustrates an example method in accordance with one embodiment.

FIG. 5 illustrates a second example method in accordance with one embodiment.

The figures are not exhaustive and do not limit the present disclosure to the precise form disclosed.

DETAILED DESCRIPTION

A vehicle can provide various features to a driver. Features can include cruise control, lane tracking, automatic lighting, or other actions to make the driving experience easier or more pleasurable. These features can be available to the driver through buttons, switches, or other actuation mechanisms. Each button may have a corresponding symbol or may comprise a particular shape to distinguish the displayed feature. Similarly, a vehicle's dashboard may light up with particular symbols to represent particular errors or features in place. As an example, a symbol may light up on the dashboard to represent low oil life, suggesting needed maintenance, while another symbol may note that cruise control for the vehicle is activated. It is important for the driver to correctly interpret these symbols and shapes, yet It can be difficult to guess the meaning behind each symbol or memorize the functions associated with each symbol. Drivers may have to search through a user manual or look for a description online to learn what a particular symbol means, which can take significant time and effort.

Embodiments of the systems and methods disclosed herein can provide an application on a mobile device that can notify the user in real time what a particular symbol, shape, feature, or warning represents through a camera in the mobile device. A user can scan the interior of a vehicle while using the application to receive descriptions of the various features or warnings displayed on the vehicle. This can be accomplished through image recognition, where the mobile device can use the camera to determine the symbols or shapes and receive data associated with the symbol or shape based on the image recognition. The mobile device can display the data to the user, which can provide a short or in depth description of the feature associated with the symbol or shape. In some embodiments, this data can be displayed on a display screen of the vehicle such as a head unit display, navigation screen, binnacle screen, or other screen. In the case where the symbol or shape represents a warning or error associated with the vehicle, the mobile device can receive data associated with the required maintenance and schedule a maintenance appointment for the user based on the determined warning or error.

Figure 1:
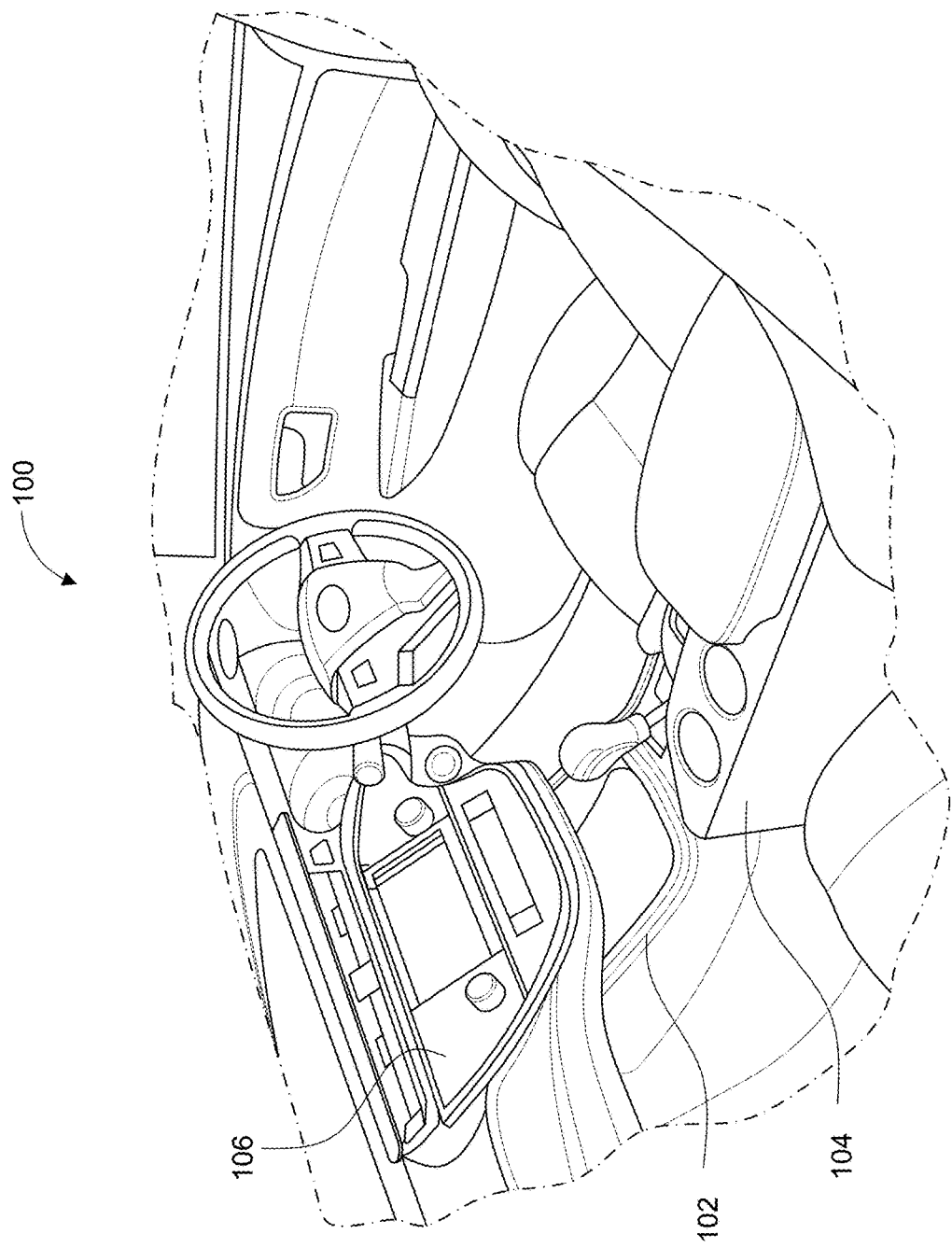
FIG. 1 illustrates an example interior of a vehicle, in which embodiments of the systems and methods disclosed herein may be implemented.

Referring now to the drawings, FIG. 1 illustrates an example vehicle interior 100 that may include a console assembly 102. The console assembly 102 may be part of a front or center console 104, a console that is centrally located in the cabin/interior of vehicle 100. As illustrated in FIG. 1, the center console 104 may extend longitudinally relative to the length of vehicle interior 100, and the console assembly 102 itself may be positioned at the forward end of the center console 104, such that is located at least partially beneath an instrument panel 106. The console assembly 102 could be formed as a separate component from the center console 104 or could be formed as part of the instrument panel 106. Additionally, the center assembly 102 could be positioned so as to be wholly beneath the instrument panel 106 or completely apart therefrom. The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. The systems and methods disclosed herein can also extend to other areas of the vehicle such as the rear seats or other areas of the vehicle. For example, in vehicles with enhanced rear passenger features, a rear passenger can apply the systems and methods disclosed herein to identify features for the rear seats.

Figure 2:
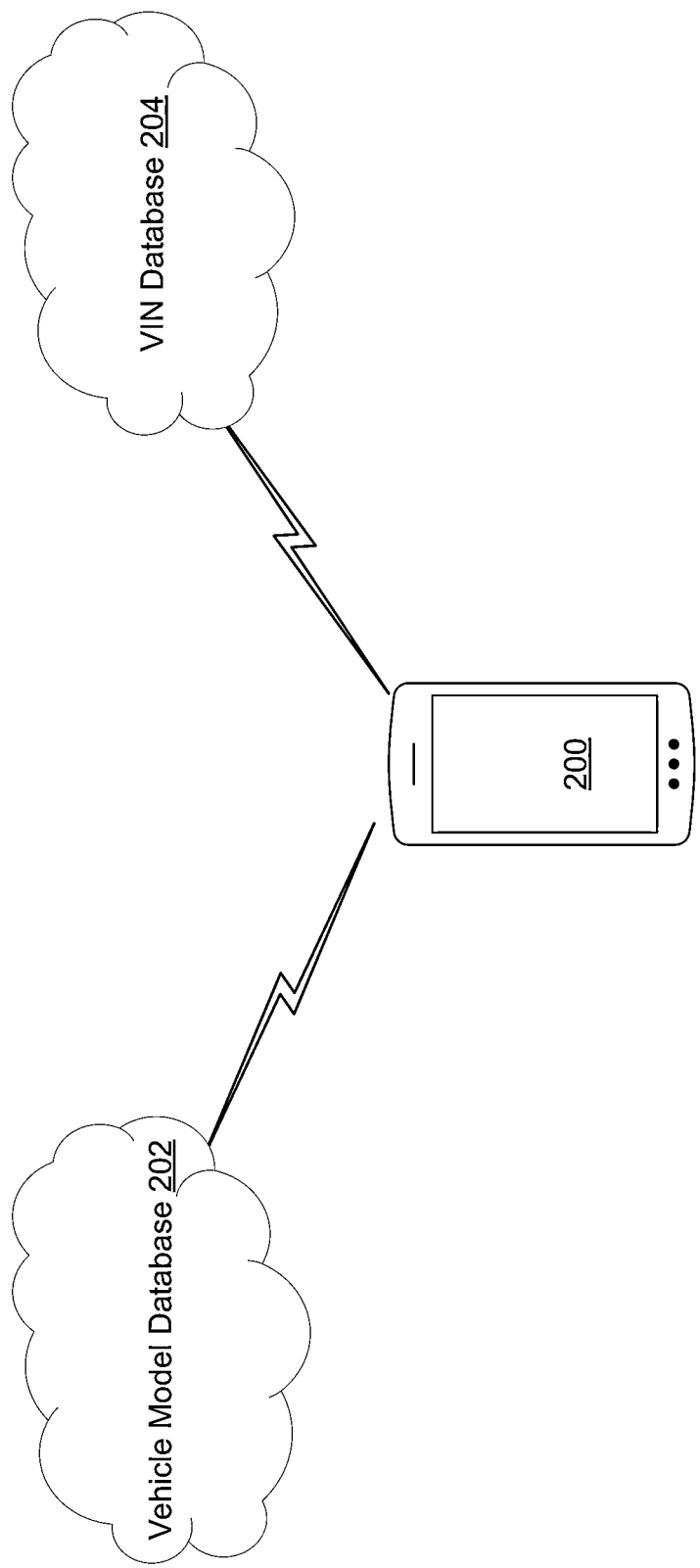
FIG. 2 illustrates an example mobile device and databases in accordance with the systems and methods disclosed herein.

FIG. 2 illustrates an example mobile device 200 in connection with databases 202 and 204. Mobile device 200 can receive data from databases 202 and 204 to provide data to the application. Vehicle model database 202 may comprise information on the make and model of particular vehicle. Based on the make and model, database 202 may comprise information found in a user manual associated with the particular make and model. This information may comprise vehicle features, maintenance requirements, operation procedures, and other information specific to the type of vehicle. In particular, the information may comprise definitions for the various symbols identified in the interior of the vehicle. As an example, database 202 may comprise information noting that a particular symbol represents high beams, and that a button comprising this symbol will activate the vehicle's high beams. As another example, database 202 may comprise information noting that buttons shaped like a triangle are hazard buttons, and that those buttons can activate a vehicle's hazard lights. The application can use information received from database 202 to provide information to the user when the application identifies particular symbols and shapes using mobile device 202's camera. Vehicle Identification Number (VIN) database 204 may comprise information associated with a particular vehicle's VIN. This may comprise information on the owner of the vehicle such as name, address, nearest dealership, or other information that may assist in scheduling a maintenance appointment for the particular vehicle. As an example, based on a particular VIN number, the database may note that this vehicle is a particular make and model and that the nearest dealership is in San Diego, California based on the owner's address. The application can use information received from database 204 to schedule a maintenance appointment for a vehicle using the VIN information.

When the user opens the application on mobile device 200, the user may provide information on the make, model, and VIN of a particular vehicle. If any or all of this information is provided, the application can retrieve data from databases 202 and 204 associated with the provided information. The application can store this information to provide access to relevant data when the user searches for a particular vehicle function or warning.

Figure 3A:
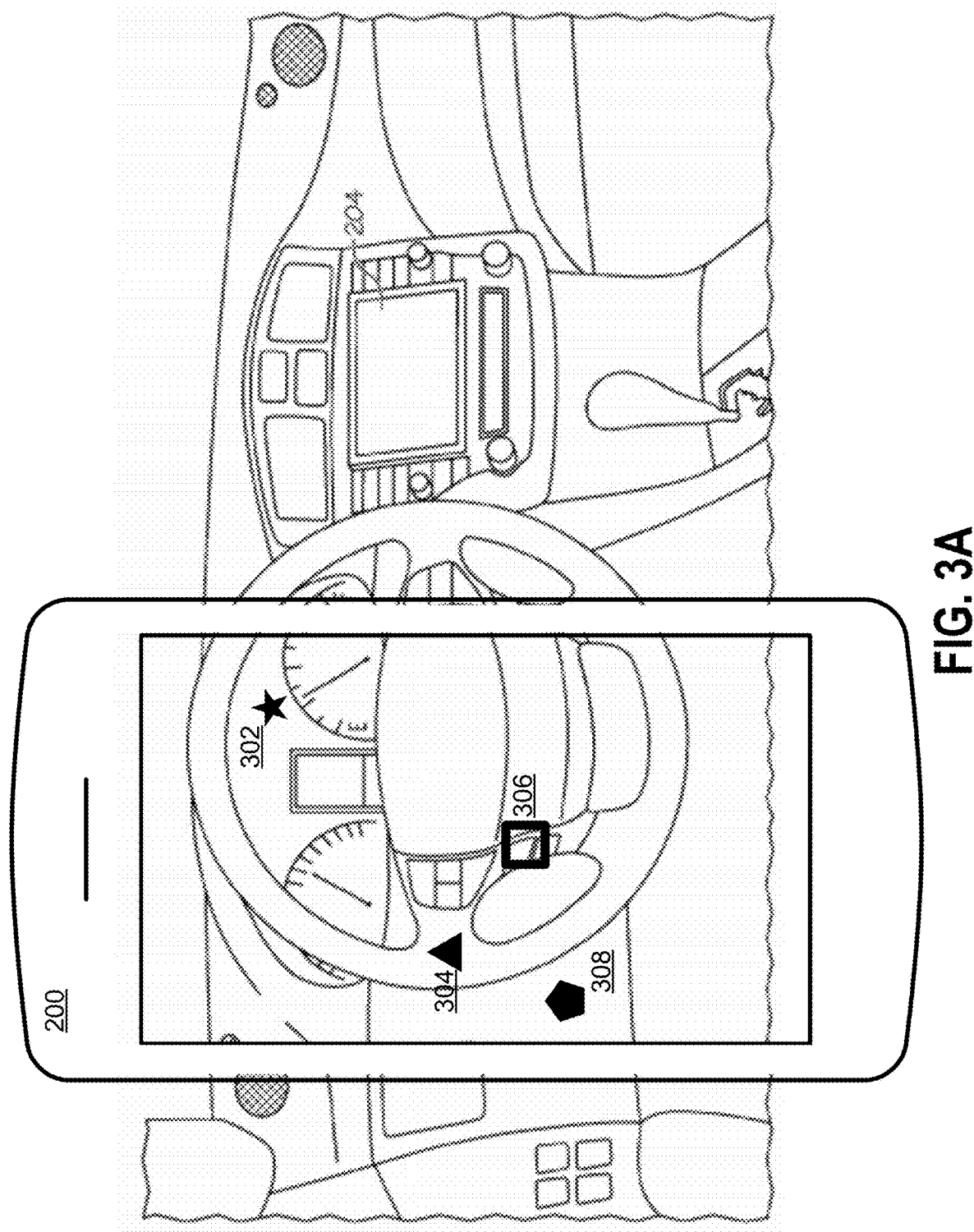
FIG. 3A illustrates an example display on a mobile device while a camera is in use, in accordance with the systems and methods disclosed herein.

FIG. 3A illustrates an example user display for the application. Mobile device 200 can activate a camera to scan the interior of the vehicle. The application can pinpoint symbols and shapes using image recognition techniques. Image recognition can be accomplished through one or more machine learning models that are pretrained to recognize symbols, shapes, and other aspects of a vehicle's interior.

Machine learning generally involves developing a model, i.e., a mathematical representation of a real-world process, where the model is able to make predictions about that real-world process. To generate a model, typically, training data is provided or input into a machine learning algorithm by means of a known dataset before application of the model in real-world scenarios or situations. In supervised learning, one method or subset of machine learning, applicable machine learning algorithms are trained on data that has been labeled or classified or otherwise categorized. Therefore, successful implementation of such machine learning algorithms depends on the accuracy with which that labeling/annotation/classification is performed. Ultimately, a model should be able to accurately predict/estimate what a detected traffic signal is conveying, whether in the real world, in a simulation, etc.

The machine learning models can retrieve data from vehicle model database 202 to determine various functions and features. As an example, one machine learning model can recognize symbols that are lit on a vehicle dashboard, and may recognize symbol 302 that is lit on the vehicle dashboard. Another machine learning model can recognize symbols that are part of buttons, switches, or actuation mechanisms to activate vehicle features. This model may determine that symbol 304 is associated with a button to activate cruise control. Another machine learning may determine the existence of an actuation mechanism based on the physical shape of the button. Example button 306 has a particular shape, which the machine learning model can identify and determine that, based on the button shape, the button can activate a vehicle's high beams. One or more machine learning models may also detect shapes or symbols on other portions of the vehicle interior besides the steering wheel and dashboard. The machine learning models can identify which part of the vehicle interior is being scanned and determine the vehicle features based on the area of the interior. The machine learning models may identify the dashboard and determine that the symbol represents an error since it is displayed on the dashboard. The application can identify symbols and shapes to allow the user to press the symbol for additional information.

Figure 3B:
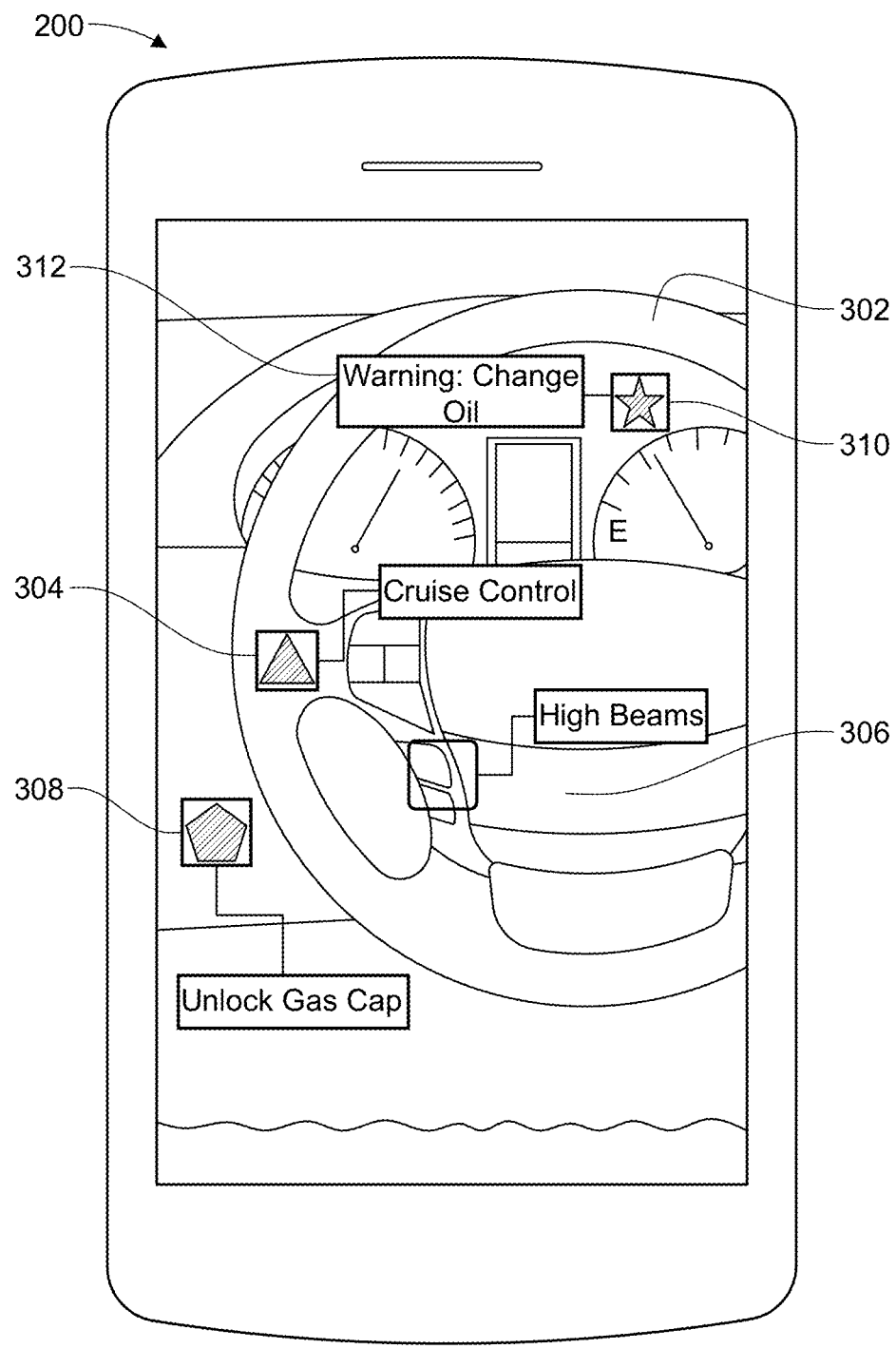
FIG. 3B illustrates a first example application display in accordance with the systems and methods disclosed herein.

FIG. 3B illustrates an example application display when the symbols and shapes are identified. The system may emphasize the discovered symbols using a box or image 310 to provide an area for the user to press. Box 310 may surround the area of the symbol or shape or may represent a graphical representation of the vehicle feature or warning. A description 312 may accompany the symbol or shape to provide an immediate definition to the purpose of the symbol or shape. Example description 312 shows that symbol 302 represents a warning to change oil. The description 312 may differentiate between a vehicle function and a warning associated with the vehicle. The user may select description 312 to see a description with more detail for the symbol or shape. This may be accomplished by a touch input on the mobile device's touch screen or through a mouse click depending on the mobile device's screen. The user may move mobile device 200 and its camera to a different area of the vehicle interior, at which point, the application can update the display to show the descriptions associated with the symbols or shapes discovered in the new camera view. Alternatively, the user can take a photograph of a particular interior view, at which point boxes 310 and 312 may be added to the photograph. The application can periodically update the descriptions and boxes based on the visible shapes and symbols. As another example, more symbols and shapes may not be visible until the camera view zooms in on a smaller area of the vehicle interior. Once the camera view zooms in, more descriptions and boxes may appear to show more visible features or warnings.

Figure 3C:
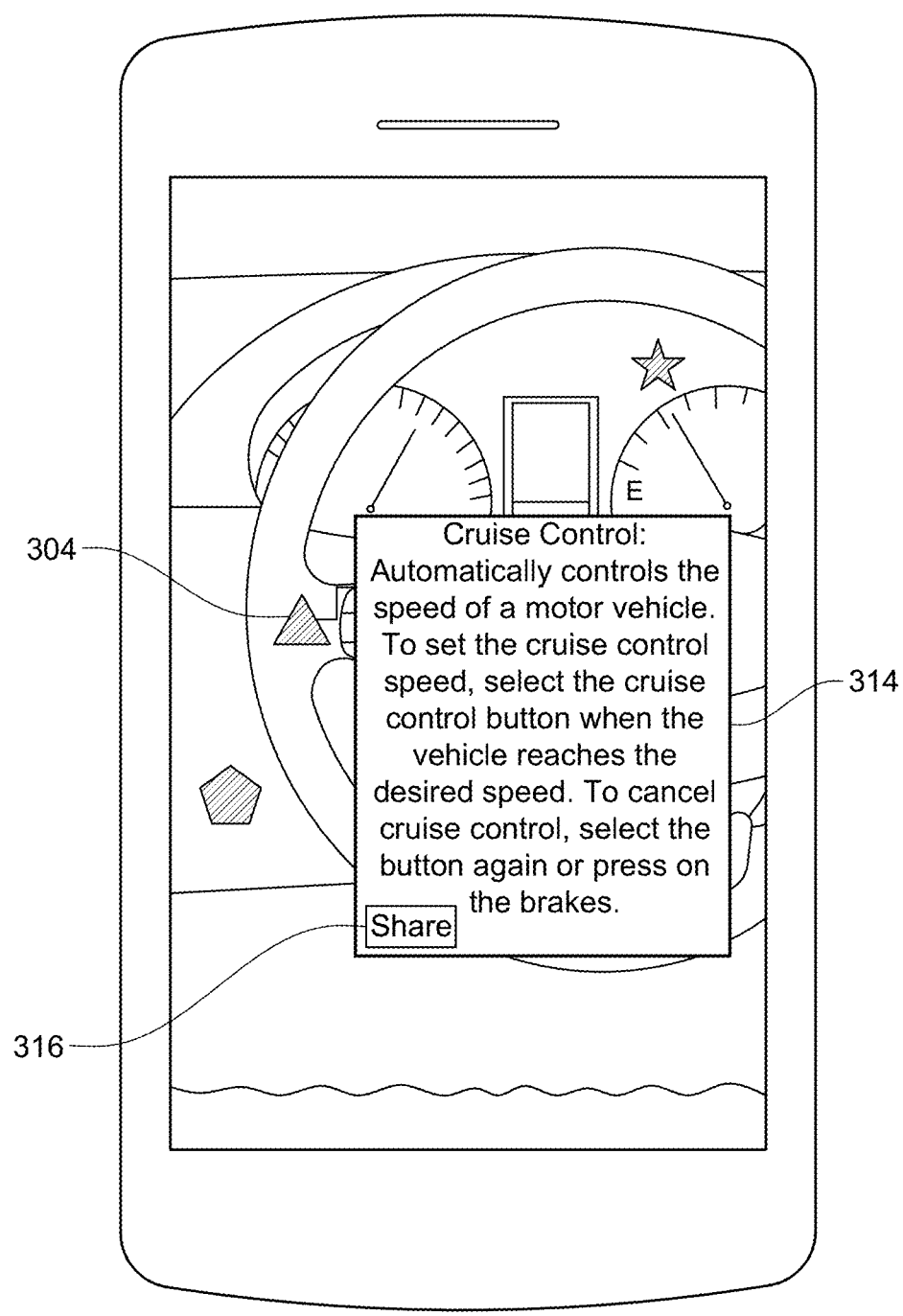
FIG. 3C illustrates a second example application display in accordance with the systems and methods disclosed herein.

FIG. 3C illustrates an example application display when description 312 is selected. In FIG. 3C, the description 314 associated with symbol 304 was selected. The application may display a longer definition. As an example, symbol 304 is associated with cruise control, so description 314 may describe the function and procedure for activating and deactivating cruise control. Description 314 may instead be a new webpage that displays the section of the user manual associated with the respective symbol. As an example, when the user selects the shorter description (e.g. description 312), mobile device 200 may open a web browser and activate a hyperlink associated with the correct webpage. Description 314 may also be a new display on the application without the corresponding camera view. Description 314 may include a share function when the description represents a vehicle feature. This share function can allow a user to share the description with another user through text message, email, social media, or other communication method. Description 314 may also include other functions besides a share function, such as "More Information" or "View User Manual".

Figure 3D:
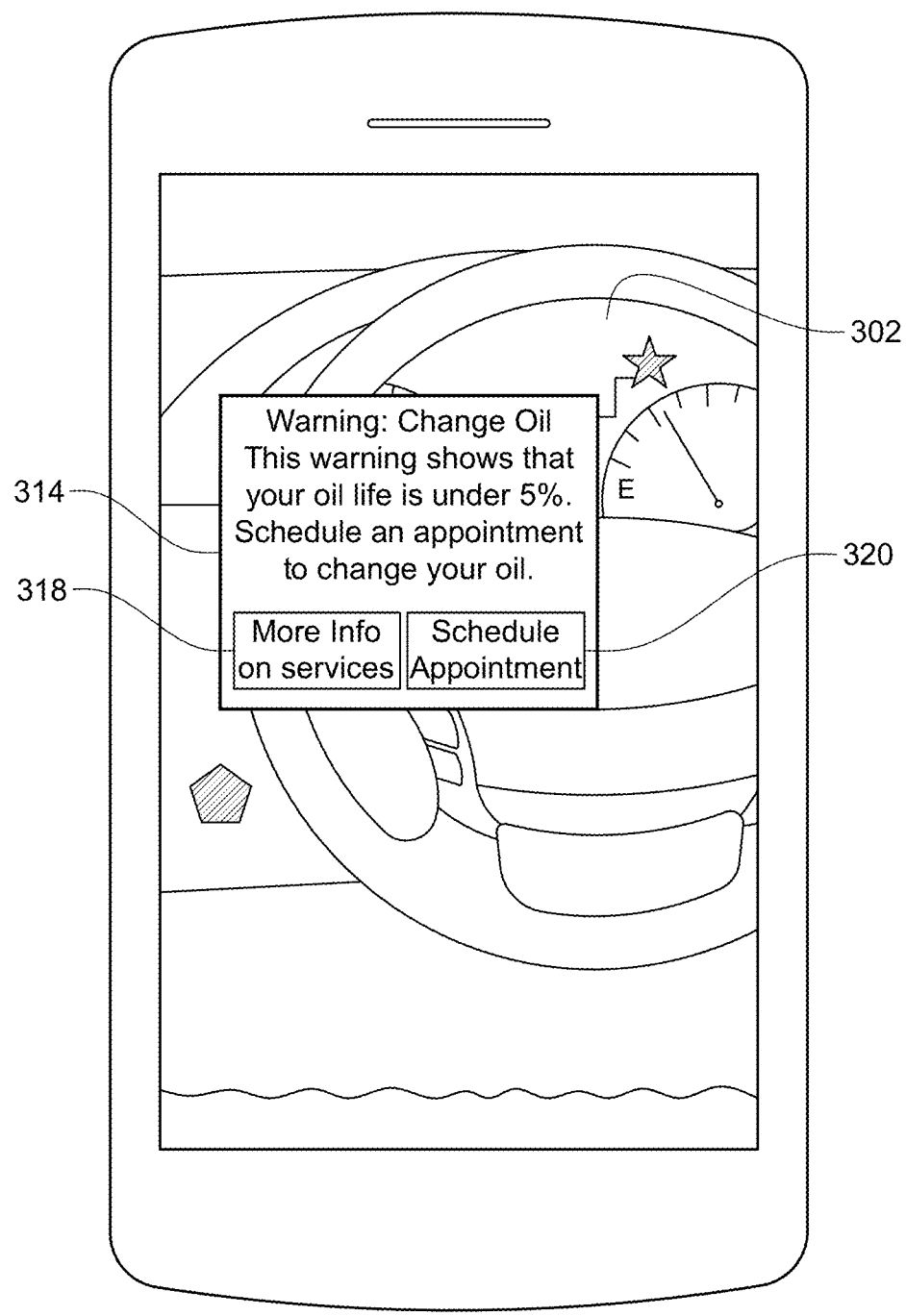
FIG. 3D illustrates a third example application display in accordance with the systems and methods disclosed herein.

FIG. 3D illustrates an example application display with additional functions provided for description 314. In FIG. 3D, the description for symbol 302 can be selected to provide longer description 314. In this example, the symbol represents a warning associated with vehicle maintenance. Description 314 may provide information on the warning and how to resolve the warning. In the example of FIG. 3D, the user can resolve a low oil life by scheduling an appointment to change the vehicle's oil. Description 314 can provide box 318 that the user can select to provide more information on the particular warning and how to resolve the issue. For example, there may be multiple methods and services that can resolve the error, so a list of available services may be provided to a user. The user may select a service and schedule a maintenance appointment.

Description 314 may also provide box 320 to schedule an appointment for the user. The user can select box 320 to open a new display to schedule an appointment. The application may receive data from VIN database 204 to automatically transmit information to a dealership outlining the error and needed maintenance, such as the type of vehicle, the particular error, the needed service, and the amount of time needed to resolve the error. The user may be able to select a date and time to schedule an appointment after selecting box 320, allowing the user to quickly schedule an appointment without needing to input a lot of information related to the appointment.

FIG. 4 illustrates an example method executable by a system or mobile device in accordance with the embodiments described herein. At block 402, the system can scan an interior of the vehicle. As described above, the application can use a mobile device camera to scan the interior of the vehicle. The application can use the camera to zoom in on particular areas of the vehicle interior. One or more machine learning models can determine what portion of the vehicle interior is being scanned to determine what functions, features or warnings may be applicable to the portion of the vehicle interior. The camera may take a photograph of the vehicle interior, such that the one or more machine learning models can analyze the photograph to determine the section of the vehicle and the visible symbols or shapes.

At block 404, the system can locate one or more symbols or shapes within the interior. As described above, the machine learning models can retrieve data from vehicle model database 202 to determine various functions and features. The machine learning models can recognize symbols that are lit on a vehicle dashboard. The machine learning models can also recognize symbols that are part of buttons, switches, or actuation mechanisms to recognize vehicle features based on the graphical symbols on the buttons or the physical shape of the actuation mechanism. The application can identify symbols and shapes to allow a user to press the symbol for additional information.

At block 406, the system can process the one or more symbols using one or more machine learning models. As described above, the machine learning models may receive information from a vehicle model database (e.g. database 202) to determine the function or definition of the symbol or shape. The vehicle model database may comprise information on the make and model of particular vehicle and information found in a user manual associated with the particular make and model. This information may comprise vehicle features, maintenance requirements, operation procedures, and other information specific to the type of vehicle. The machine learning models can determine which functions and features are applicable to the visible shapes or symbols. The applicable data can be forwarded to the application to be displayed to the user.

At block 408, the system can obtain data associated with the one or more symbols or shapes. As described above, this data may comprise the function of the symbols or shapes, definitions, solutions for error messages, needed maintenance services, and other information to describe the purpose of the symbols or shapes. This data can be available to the user through a dynamic display where the user can select boxes to receive further information on a particular symbol or shape.

At block 410, the system can display the data associated with the one or more symbols or shapes to the user or a driver of the vehicle at issue. The application may emphasize the discovered symbols using a box or image to provide an area for the user to press. A description may accompany the symbol or shape to provide an immediate definition to the purpose of the symbol or shape. The application can periodically update the descriptions and boxes based on the visible shapes and symbols. The application may provide a new webpage that displays the section of the user manual associated with the respective symbol. This display may change as the user scans the interior of the vehicle to illustrate new symbols and shapes as they come into the camera's view. In some embodiments, the data can be displayed on a display screen of the vehicle.

FIG. 5 illustrates another example method 500 executable by a system or mobile device in accordance with the embodiments described herein. At block 502, the system can scan the interior of the vehicle with a camera of a mobile device, in accordance with block 402 described above. At block 504, the system can locate one or more symbols or shapes within the interior in accordance with block 404 described above. At block 506, the system can process the one or more symbols or shapes using one or more machine learning models, in accordance with block 406 described above. At block 508, the system can obtain data associated with the one or more symbols or shapes, in accordance with block 408 described above.

At block 510, the system can determine that the one or more symbols or shapes symbolize one or more errors. As described above, the machine learning models can identify which part of the vehicle interior is being scanned and determine the vehicle features based on the area of the interior. The machine learning models may identify the dashboard and determine that the symbol represents an error since it is displayed on the dashboard.

At block 512, the system can display the data associated with the one or more symbols or shapes. As described above, a description in the application may provide information on the warning and how to resolve the warning. The description may also provide a box to schedule an appointment for the user. The user can select a box to open a new display to schedule an appointment. This information may be displayed on a display screen of the vehicle, as described above.

At block 514, the system can receive a prompt from the user to make an appointment. The application may receive data from the VIN database to automatically transmit information to a dealership outlining the error and needed maintenance, such as the type of vehicle, the particular error, the needed service, and the amount of time needed to resolve the error.

At block 516, the system can schedule an appointment for vehicle maintenance. The user may be able to select a date and time to schedule an appointment after selecting the box described above, allowing the user to quickly schedule an appointment without needing to input a lot of information related to the appointment.

Figure 6:
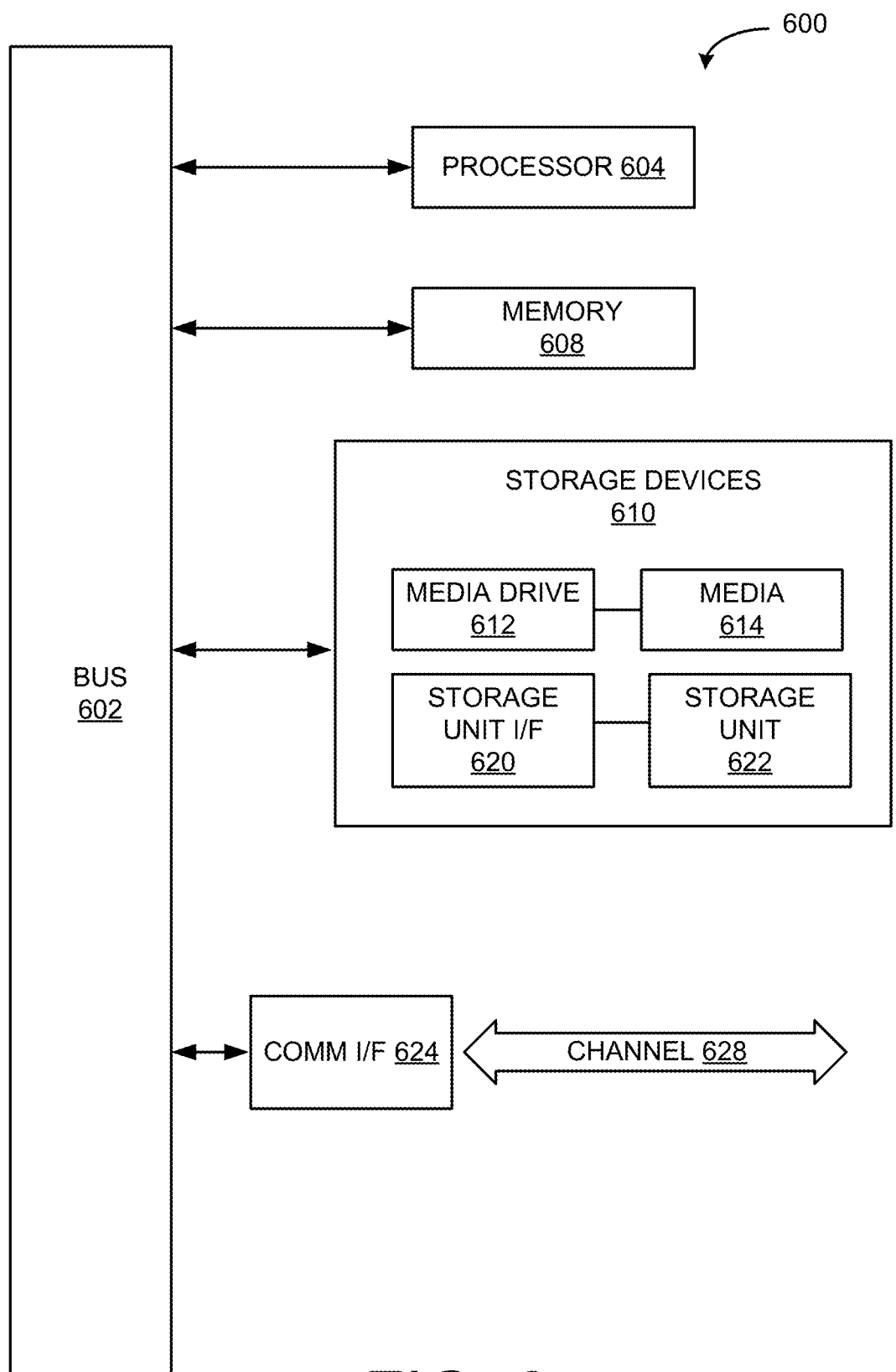
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining features in a vehicle, comprising:
   scanning an interior of the vehicle with a camera of a mobile device;
   locating one or more symbols or shapes within the interior;
   processing the one or more symbols or shapes using one or more machine learning models to determine that a switch comprising the one or more symbols activates a driving feature of the vehicle when the switch is operated by an occupant of the vehicle;
   obtaining data associated with the one or more symbols or shapes describing the driving feature; and
   displaying the data associated with the one or more symbols or shapes to a driver of the vehicle.

2. The method of claim 1, wherein displaying the data associated with the one or more symbols or shapes comprises displaying the data on a live camera view of the interior of the vehicle.

3. The method of claim 2, wherein displaying the data on the live camera view comprises locating one or more additional symbols or shapes within the interior when the live camera view focuses on a different portion of the interior.

4. The method of claim 2, wherein displaying the data on the live camera view comprises locating one or more additional symbols or shapes within the interior when the live camera view zooms in on a portion of the interior.

5. The method of claim 1, wherein displaying the data associated with the one or more symbols or shapes comprises displaying the data on a photograph of the interior of the vehicle.

6. The method of claim 1, wherein determining that the one or more symbols correspond to activating the driving feature of the vehicle comprises determining that a symbol or shape of the one or more symbols or shapes is located on a dashboard of the vehicle.

7. The method of claim 1, wherein processing the one or more symbols or shapes comprises determining a function of an actuation mechanism based on a shape of the actuation mechanism.

8. The method of claim 1, wherein locating one or more symbols or shapes within the interior comprises determining what area of the interior is being scanned.

9. The method of claim 8, wherein determining that the one or more symbols correspond to activating the driving feature of the vehicle is based on the area of the interior being scanned.

10. The method of claim 1, wherein determining that the one or more symbols correspond to activating the driving feature of the vehicle comprises:
    determining that the one or more symbols are associated with an actuation mechanism; and
    determining a function of the actuation mechanism.

11. The method of claim 1, wherein displaying the data comprises displaying a description of the driving feature when the driver presses an image of the one or more symbols on a display.

12. A mobile device comprising:
    a processor; and
    a memory coupled to the processor to store instructions, which when executed by the processor, cause the processor to perform operations, the operations comprising:
    scanning a dashboard of a vehicle with a camera of a mobile device;
    locating one or more symbols or shapes displayed on the dashboard;
    processing the one or more symbols or shapes using one or more machine learning models;
    obtaining data associated with the one or more symbols or shapes;
    determining that a switch comprising the one or more symbols or shapes activates a driving feature of the vehicle when the switch is operated by an occupant of the vehicle; and
    displaying the data associated with the one or more symbols or shapes to a driver of the vehicle, wherein the data describes the driving feature.

13. The mobile device of claim 12, wherein displaying the data associated with the one or more symbols or shapes comprises displaying the data on a live camera view of the dashboard.

14. The mobile device of claim 12, wherein displaying the data associated with the one or more symbols or shapes comprises displaying the data on a photograph of the dashboard.

15. The mobile device of claim 12, wherein determining that the one or more symbols correspond to activating the driving feature of the vehicle comprises determining that the one or more symbols or shapes are located on a dashboard of the vehicle.

16. A non-transitory machine-readable medium having instructions stored therein, which when executed by a processor, cause the processor to perform operations, the operations comprising:
    scanning an interior of a vehicle with a camera of a mobile device;
    determining what area of the interior is being scanned;

locating one or more symbols or shapes within the interior;
determining that a switch comprising the one or more symbols or shapes activates a driving feature of the vehicle when the switch is operated by an occupant of the vehicle;
obtaining data associated with the one or more symbols or shapes describing the driving feature; and
displaying the data associated with the one or more symbols or shapes to a driver of the vehicle.

17. The non-transitory machine-readable medium of claim 16, wherein displaying the data associated with the one or more symbols or shapes comprises displaying the data on a live camera view of the interior of the vehicle.

18. The non-transitory machine-readable medium of claim 16, wherein displaying the data associated with the one or more symbols or shapes comprises displaying the data on a photograph of the interior of the vehicle.

19. The non-transitory machine-readable medium of claim 16, wherein determining that the one or more symbols correspond to activating the driving feature of the vehicle comprises determining that a symbol or shape is located on a dashboard of the vehicle.

20. The non-transitory machine-readable medium of claim 16, wherein processing the one or more symbols or shapes comprises determining a function of an actuation mechanism based on a shape of the actuation mechanism.

* * * * *